June 24, 1930.  H. ACKERMANN  1,767,163
MOLDING BOX
Filed Jan. 16, 1928  3 Sheets-Sheet 1
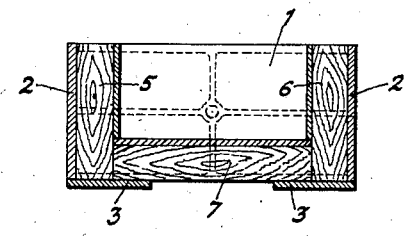
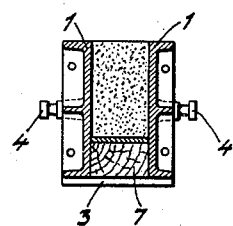
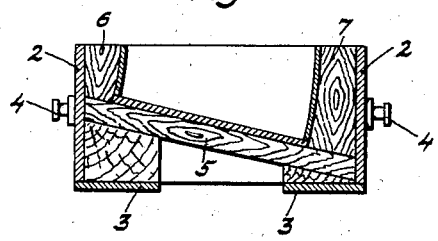
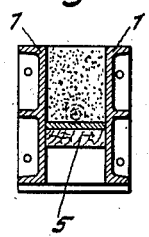
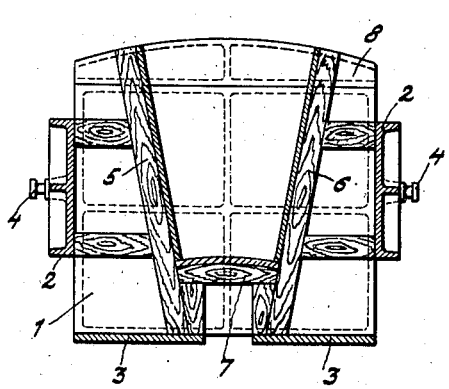
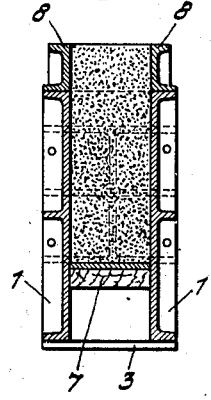

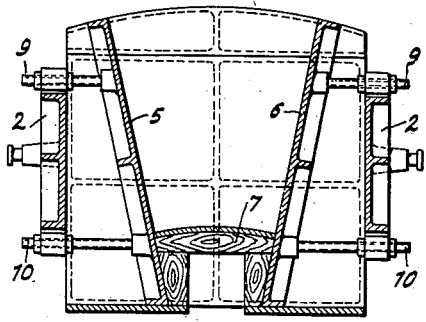
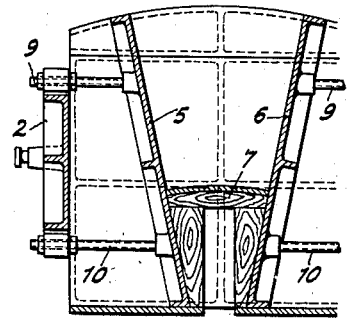
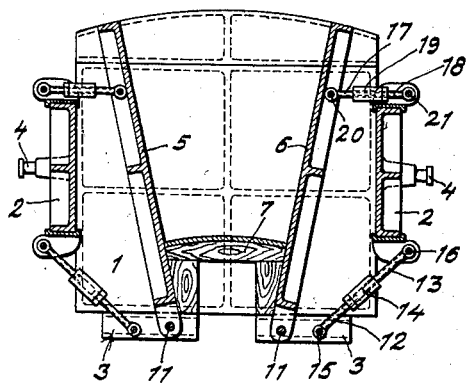
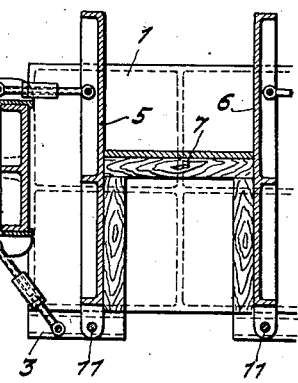
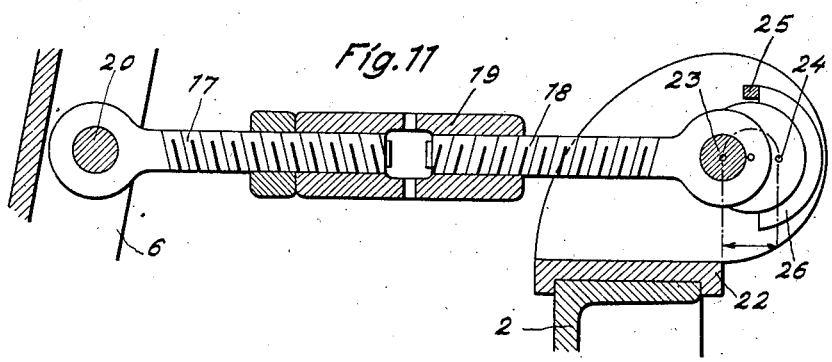

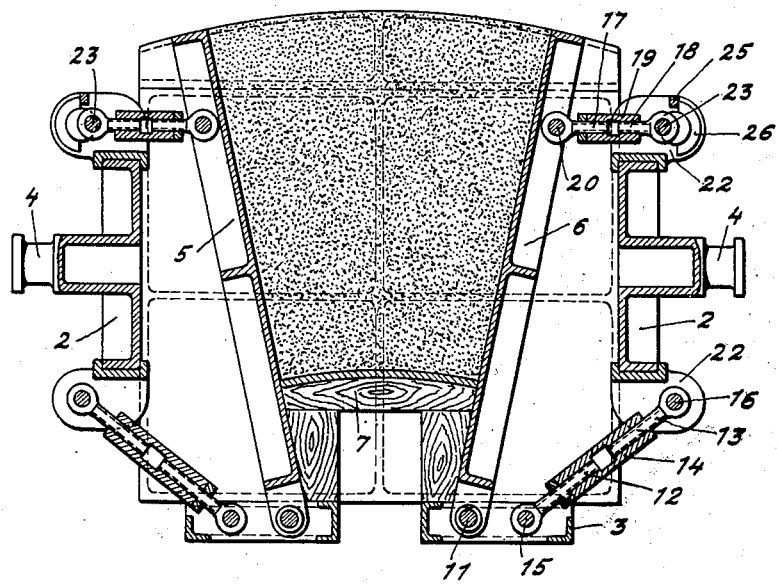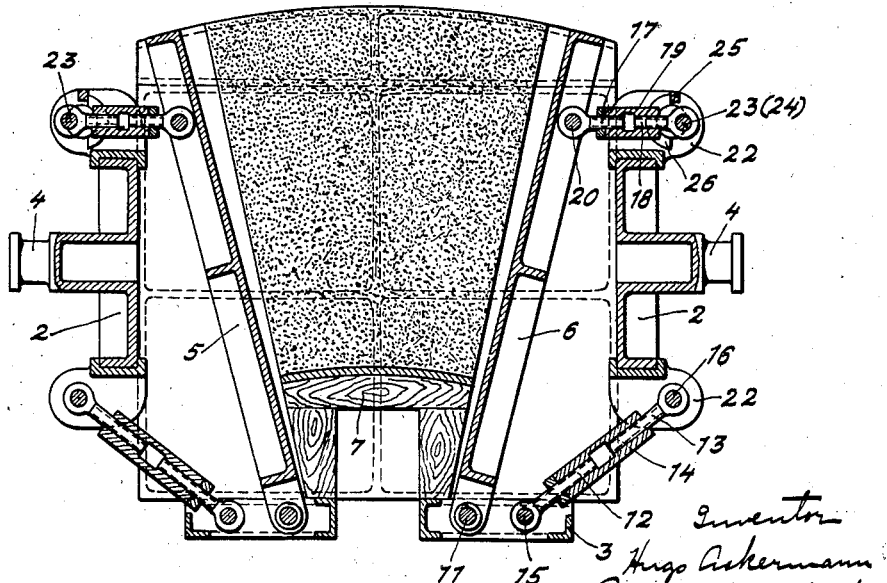

Patented June 24, 1930

1,767,163

UNITED STATES PATENT OFFICE

HUGO ACKERMANN, OF GODESBERG-ON-THE-RHINE, GERMANY

MOLDING BOX

Application filed January 16, 1928, Serial No. 247,223, and in Germany January 17, 1927.

The present invention relates to molding boxes and more particularly to that type suitable for the molding of blocks, slabs or other large moldings having at least two plane parallel surfaces and which are made from ceramic masses of low plasticity. Owing to the small amount of binding means contained therein, the mass of low plasticity, must be shaped by powerful mechanical treatment in order to avoid cavities, and in order to press as intimately together as possible the individual grains of the mass, inclosed by the binder. The mass introduced into the molding box in layers is for this purpose preferably treated and compressed by ramming or tamping.

The object of the present invention is, to construct permanent molding boxes in which essential elements are used unchanged for all sizes and shapes of blocks and which are provided with devices permitting of easy handling of the empty or charged molds and also rapid execution of the operations required for discharging the mold and reassembling it for a new molding process.

In its simplest form the permanent mold box consists of two parallel, rectangular, opposite walls, with plane and smooth internal surfaces, held at a distance apart equal to the thickness of the block by lateral connecting members, serving as support for insert elements, for filling pieces inserted between the parallel walls.

The space left between the parallel walls and the insert elements bearing against the connecting members forms the molding chamber and determines the shape of the block. This simplest form of construction has already the advantage that the parallel main walls of the molding box may be used for all shapes and sizes of blocks coming within their dimensions, and may therefore be executed as plates of cast iron or steel on which the stress on tamping the mass in the mold has no detrimental effect. In this simplest form of the permanent molding box, changes of the shape of the block, the thickness remaining equal, require new insert elements corresponding to the new shape of the block. Alteration of the thickness of the block also requires new connecting members.

In the case of molding many blocks of equal thickness, i. e. when the distance between the parallel main walls of the molding box remains constant, it is advantageous to provide the lateral insert elements adjustable relative to the connecting members, which permits of rapid and extensive alteration of the size of the molding chamber. The device for adjusting the lateral insert elements can also advantageously be used for releasing the block from the insert elements before removing the mold box.

Pivot pins or holes by means of which the molding box can be lifted and turned in a hanging device connected with a travelling crane, are provided externally on the two parallel main walls of the molding box or on two opposite lateral connecting members, facilitating the operations required in using the molding box.

The invention is more particularly described with reference to the accompanying drawings in which several examples of construction of the invention are shown and in which:—

Fig. 1 is a longitudinal sectional elevation of the simplest form of construction according to the present invention.

Fig. 2 is a corresponding cross sectional view.

Fig. 3 is a longitudinal sectional view in elevation showing modified forms of insert elements.

Fig. 4 is a corresponding cross sectional view.

Figs. 5 and 6 are longitudinal and cross sectional views in elevation respectively of a further modified form of construction.

Fig. 7 is a longitudinal sectional view in elevation of a molding box with adjustable lateral insert elements.

Fig. 8 shows the same molding box with the insert elements adjusted for molding a smaller and narrower block having the same angle of center.

Fig. 9 is a sectional view in elevation showing a molding box with adjustable lateral insert elements capable of varying their inclination, arranged for molding a radial block.

Fig. 10 shows the same molding box as Fig. 9 with the lateral insert elements in a vertical position arranged for molding a rectangular block.

Fig. 11 is a detail view showing, on a large scale, a special arrangement of the adjusting device adapted to vary the inclination of the lateral insert elements.

Figs. 12 and 13 are sectional elevations of a molding box explaining the operation of the adjusting device shown in Fig. 11.

In the drawings Figs. 1 to 6 relate to the simplest form of construction of the permanent molding box with fixed connecting members and fixed insert elements, whilst Figures 7 to 13 relate to permanent mold boxes with adjustable side members, and also details of a special construction of the adjusting mechanism.

The permanent molding box shown in Figures 1 and 2 consists of parallel rectangular plane walls 1, 1 held apart at a distance corresponding to the width of the block to be molded by connecting members 2, 3. The insert elements 5, 6, 7, the internal faces which define the shape of the block together with the free internal faces of the parallel walls, 1, 1, bear against the connecting members 2, 3. The block is in this case a rectangular slab e. g. a tank-block for a glass furnace.

The mass is introduced into the mold chamber from above in layers and compressed by ramming, tamping or beating.

The parallel walls 1, 1 are provided in this form with pivot pins or bearings 4 by means of which the molding box can be lifted and turned by a crane provided with a suitable hanging device. After the block has been rammed or tamped and its top surface finished by smoothing along the top edge of the walls 1, 2, a supporting-plate with a plane surface is placed on the molding box and is temporarily secured to the walls by screws or clamps. The molding box is then lifted by means of the pins 4 and a hanging device, turned through 180° in the hanging device, and lowered again until the supporting plate rests on the floor or on a suitable support. The temporary connection between the supporting plate and walls 1, 1, is now removed and the molding box is drawn upwards off the block resting on the supporting plate, by means of the hanging device, and is ready for recharging after being again turned through 180°.

By this operation the block stands on the supporting plate with its last tamped surface. This is admissible for blocks, the height of which is not much greater than the width, determined by the interval between the parallel walls 1, 1.

If however the height of the block is considerably greater than its width, changes of the shape of the freshly molded block resting on edge after removal of the mold may take place. For block of this type, the modification of the mold box shown in Figures 3 and 4 is provided, in which the pivot pins are arranged not on the parallel walls 1, 1, but on the lateral connecting members 2, 2.

The mold box shown in Figures 3 and 4, consists of the parallel walls 1, 1, two lateral connecting members 2, 2, two lower connecting members 3, 3 and the insert elements 5, 6, 7, the internal faces of which, together with the free surfaces of the parallel walls 1—1 enclose the molding chamber for a radial block, for instance for the shaft of a blast-furnace. After the block has been tamped or rammed and the top has been smoothed by scraping along the upper edge of the parallel walls 1—1, the charged molding box is raised on the pins 4 by means of a hanging device and lowered again after being turned through 90°. The wall 1 now at the top is then released from the connecting members and replaced by a suitable supporting plate which is temporarily fastened to the lateral connecting members. The molding box is then again raised by the pins 4 turned through 180° and lowered on to the supporting plate. After releasing the temporary connection between the supporting plate and the connecting members, the molding box is then withdrawn by means of the pins 4 from the block, which now rests flat on the supporting plate, turned through 180° and after replacing and securing the previously removed wall 1 and a further rotation through 90° is again ready for a new molding.

In the arrangement of the insert elements 5, 6, 7 as shown in Figs. 3 and 4, the radial block is tamped from one of its radial sides. If it is necessary to obtain very great accuracy of the radial faces, it is preferable to tamp the radial brick from the outermost curved face.

An arrangement of the molding box in which this method of molding is possible is shown in Figures 5 and 6. The parallel walls 1—1 are for the purpose preferably made approximately square as now two lateral insert elements 5 and 6 for the two long radial faces of the brick must be arranged between the lateral connecting members 2, 2.

As shown in the drawings, the permanent mold rests in the molding position on the lower connecting members 3, 3 against which bear the lower insert element 7 for the inner curved face of the radial block and the lower ends of the lateral interest elements 5 and 6, the latter also bearing against the lateral connecting members 2—2. In order to simplify the finishing and smoothing of the outer cylindrical face of the radial block additional extension pieces 8, the top face of which are curved corresponding to the convex curve of the radial block are secured to the parallel walls 1—1. The radial length of the radial block is determined by the distance of the outer surface of the extension pieces 8 from the upper surface of the lower insert element 7. The pivotal pins 4 are again mounted on the lateral connecting members 2, 2. The working steps in operating molding boxes as shown in Figures 5 and 6 are therefore the same as described in connection with the molding box shown in Figures 3 and 4.

In the forms of application of the invention described above, the two rectangular or square parallel walls 1—1 are used again for molding all blocks coming within their dimensions. They may therefore, as permanent mold elements, be made of cast iron or steel. The cost of material is negligible in view of the length of use possible. The connecting members 2 and 3 are also used again for blocks of the same widths, and may also be made of iron or another resistant material. The insert elements 5, 6 and 7 must however, be adapted to each new shape of the block and therefore, unless large quantities are to be molded, must be made of wood in order to reduce the cost. The surface of the wooden insert element facing the block is preferably protected against wear by a cover of sheet steel.

The modification of the lateral insert elements 5 and 6 shown in Figures 7 and 8, makes it possible to use the same lateral insert elements for the molding of wider and narrower radial blocks with the same angle of center and the same thickness. This is effected by adjustably supporting the lateral insert elements against the lateral connecting members 2—2, for example by screws 9, 10. The lateral insert elements 5 and 6 which can now be used for a larger number of blocks may preferably also be made of resistant material, for example iron. In Figures 7 and 8 the same molding box is shown arranged for molding blocks of different size but of the same angle of center.

Figures 9 and 10 show a modification of the adjusting device by which it is possible to vary also the inclination of the lateral insert elements, and thereby render the molding box capable for molding radial blocks with different angles of center and even, as shown in Figure 10, slabs with parallel sides. For this purpose, the lateral insert elements 5 and 6 are pivotally supported against the parallel walls 1 by bolts 11, mounted in the lower connecting members 3, 3 which are in turn adjustably mounted on the bottom side of the walls 1. The position of adjustment of the bolts 11 is secured by screwing up the spindles 12 and 13, provided with right and left threads, screw-nut 14 and bolts 15 and 16 against the lateral connecting members 2. The required inclination of the lateral insert elements 5, 6 is determined by suitably setting the spindles 17, 18, provided with right and left threads, screw-nut 19 and bolts 20, 21 against the lateral connecting members 2, 2.

In this construction, for blocks of equal thickness, only the lower insert elements 7 must be adapted to the shape of the block.

On tamping or beating the mass in the mold, a pressure corresponding to the compression of the mass is exerted by it on the walls of the molding box. This pressure, particularly that acting on the lateral insert elements 5, 6, results in frictional forces opposing the withdrawal of the molding box. It is therefore advantageous to loosen the side elements 5, 6 before lifting the molding box off the block in order to facilitate its removal and to avoid damaging the block. This may be effected by reducing the distance between the bolts 20 and 21 of the upper spindles 17, 18 by suitably turning the screw-nut 19. As the lower pivotal point of the lateral insert elements 5 and 6 is located outside the parallel walls 1, 1 i. e. below the lower insert element 7, the lateral insert elements 5 and 6 are released over their whole length from the block and from the lower insert element 7, on being turned about the bolts 11. If the molding box is now lifted by means of the pins 4, the block is left on the supporting plate together with the lower insert element 7, without any danger of damaging. The insert element 7 may then be removed and inserted again into the molding box which has meanwhile been turned through 180°. This method of loosening the lateral insert elements has the disadvantage, that it necessitates a disarrangement of the upper supporting spindles 17, 18, which must be removed again every time by readjusting the correct distance between the bolts 20—21 before each new molding operation. This causes, apart from loss of time, a danger of inaccuracies in the repeated readjustment.

This danger is avoided by the special construction of the upper support of the lateral insert elements shown in Figures 11, 12 and 13. Figure 11 shows the modified support on a larger scale. The outer head of the spindle 18 is not supported as previously described directly by a bolt mounted on the lateral connecting member 2 or on a bearing 22, located thereon, but on a crank pin 23, which, on rotating from the inner dead centre, shown in the drawing, into the outer dead centre 24, draws the spindles 17 and 18, connected by the screw-nut 19, and the bolt 20, outwards for a distance equal to the diameter of the crank circle. The lateral insert element 5 or 6 is turned outwards thereby about the lower bolt 11 through an angle determined by the distance between the bolts 11 and 20 and the path of the bolt 20, and is thereby released from the block and the lower insert element 7. The position of adjustment of the lateral insert elements 5 and 6 suitable for the block to be molded, is recovered every time by turning the crank pin back through 180° into the inner dead centre position shown. The crank shaft is turned for example by a lever mounted thereon or by a rectangular end provided on the shaft and a key. The end positions of the crank are preferably fixed by suitable means e. g. by a stop 25 on the bearing 22 and a recessed flange 26 on the crank shaft. By this device, the lateral insert elements are released from the block only by turning the crank shaft. The adjustment of the supporting spindles 17, 18 remains unaltered as long as the same block is being molded.

Figures 12 and 13 are longitudinal sections of a molding box for a radial block provided with the supporting mechanism as shown in Figure 11. In Figure 12, the lateral insert elements 5 and 6 are shown in the molding position, bearing against the molded block and the insert element 7. Figure 13 shows the two crank pins 23, 23 in their outer dead centres 24, in which the lateral insert elements 5 and 6 are turned outwards about the bolts 11 and thereby released from the block.

In the application of the invention shown in Figures 12 and 13 the pivot pins 4 are mounted on the lateral connecting members 2. The operations required to remove the block from the molding box and prepare it for a further molding operation are therefore the same as described in connection with the molding box shown in Figures 3 and 4, with the addition that before withdrawing the molding box, the lateral insert elements 5 and 6 are released from the block by turning the crank pins 23 outwards through 180° and are returned to the molding position by turning the crank pins 23 back into their inner dead centres, before replacing the wall 1, removed for the temporary mounting of the supporting plate.

As set forth, the connecting members have the double task to support the insert elements and to hold apart the parallel walls at a given distance. For this last purpose it is not absolutely necessary that all of the connecting members are rigidly fastened to both of the parallel walls. In most cases it may suffice to fasten only the lateral connecting members 2—2 rigidly to both of the parallel walls, the connection of one of the walls being such as to be easily removable to facilitate taking off this wall before temporary mounting the supporting plate.

The lower connecting members 3—3 may, if desired, only be fastened to one of the parallel walls, preferably to that, which stays in rigid connection to the lateral connecting members 2, 2. In this case the lower connecting members 3, 3 may be made of such a length as to be used for molding blocks of different thickness. The fact, that in molding blocks of smaller width the members 3, 3 project beyond one of the parallel walls, is of no importance, as in the vertical molding position, the molding box is standing on the connecting members 3, 3, serving in the mean time to support the parallel walls and the insert elements.

The construction described above causes the permanent molding box to be an extraordinarily adaptable device for block molding. Blocks of the same thickness but of all kinds of shapes, for example all the blocks of the internally and externally conical wall of the shaft of a blast-furnace, may be molded in a molding box of the kind shown in Figure 12. This constitutes a considerable economical advantage over the necessity hitherto existing of making a separate molding frame for each shape of block.

The permanent molding box provided with the adjusting means for the lateral insert elements shown in Figure 11 allows very rapid operating on emptying and reassembling of the molding box and on adjusting the same for other blocks.

In all the types of the mold box, even the simpler ones, the pins or holes provided on the parallel walls or lateral connecting members allow convenient lifting and turning of the molding box even when of great weight. Thus all the important parts of the molding box, in all the modifications the parallel walls and connecting members and in the modifications with adjustable lateral insert elements also the latter, may consist of resistant material e. g. cast iron or steel, without regarding the higher cost of material because these parts of the mold box can be continually used. When the insert elements are not adjustable as for instance the lower insert elements 7 in the modification shown in Figures 7–10 and 12, 13 or all the insert elements 5, 6 and 7 in the modifications shown in Figures 1 to 6, they are preferably made also of cast iron or steel when large numbers of the same shape of block are to be made. For smaller quantities, the insert elements are, for economical reasons, made of wood and in this case are, as shown in the drawings, protected on the faces forming the molding chamber by iron plates. Owing to the ease of handling even very heavy molding boxes by means of the pins or holes (4) provided, these protective plates may be thick enough to prevent any alteration of shape of the insert elements on tamping the mass in the mold.

All the walls of the molding chamber may consist of iron or steel in molding boxes constructed according to the invention, even for bricks of very large dimensions. The improved molding boxes allow therefore of an accuracy hitherto unattainable in the manufacture of blocks, slabs or other large bricks by ramming or tamping a material of low plasticity.

I declare that what I claim is:—

1. A molding box for slabs, blocks and other objects having at least two plane, parallel faces, molded by tamping a mass of low plasticity, comprising in combination a pair of plane, parallel walls, lateral connecting members provided at the opposite sides and lower connecting members provided adjustably beneath the parallel walls, the lateral connecting members being adapted to space apart said parallel walls at a distance corresponding to the width of the object to be molded, insert elements arranged between said parallel walls, bearing against said connecting members, adapted to determine the shape of the object to be molded and means adapted to lift and turn the molding box.

2. A molding box for slabs, blocks and other objects having at least two plane, parallel faces, molded by tamping a mass of low plasticity, comprising in combination a pair of plane, parallel walls, lateral connecting members provided at the opposite sides and lower connecting members provided adjustably beneath the parallel walls, the lateral connecting members being adapted to space apart said parallel walls at a distance corresponding to the width of the object to be molded, insert elements arranged between said parallel walls, means for adjustably supporting said insert elements against said connecting members, said insert elements being adapted to determine the shape of the object to be molded.

3. A molding box for slabs, blocks and other objects having at least two plane, parallel faces, molded by tamping a mass of low plasticity, comprising in combination a pair of plane, parallel walls, lateral connecting members provided at the opposite sides and lower connecting members provided adjustably beneath the parallel walls, the lateral connecting members being adapted to space apart said parallel walls at a distance corresponding to the width of the object to be molded, insert elements arranged between said parallel walls, means for adjustably supporting said insert elements against said connecting members, said insert elements being adapted to determine the shape of the object to be molded and means adapted to lift and turn the molding box.

4. A molding box for slabs, blocks and other objects having at least two plane, parallel faces, molded by tamping a mass of low plasticity, comprising in combination a pair of plane, parallel walls, lateral and lower connecting members adapted to space apart said parallel walls at a distance corresponding to the width of the object to be molded, one lower and two lateral insert elements arranged between said parallel walls, adapted to determine with their inner faces the shape of the object to be molded and bearing against said connecting members, said lateral insert elements being pivotally supported at the lower end by pivots adjustably provided outside and beneath the parallel walls and means for adjustably supporting said lateral insert elements against the lateral connecting members.

5. A molding box for slabs, blocks and other objects having at least two plane, parallel faces, molded by tamping a mass of low plasticity, comprising in combination a pair of plane, parallel walls, lateral and lower connecting members adapted to space apart said parallel walls at a distance corresponding to the width of the object to be molded, one lower and two lateral insert elements arranged between said parallel walls, adapted to determine with their inner faces the shape of the object to be molded and bearing against said connecting members, said lateral insert element being pivotally supported at the lower end by pivots adjustably provided outside and beneath the parallel walls, means for adjustably supporting said lateral insert elements against the lateral connecting members and means adapted to lift and turn the molding box.

6. A molding box for slabs, blocks and other objects having at least two plane, parallel faces, molded by tamping a mass of low plasticity, comprising in combination a pair of plane, parallel walls, lateral connecting members provided at the opposite sides of the parallel walls and lower connecting members provided adjustably beneath the parallel walls, the lateral connecting members being adapted to space apart said parallel walls at a distance corresponding to the width of the object to be molded, one lower and two lateral insert elements arranged between said parallel walls, adapted to determine with their inner faces the shape of the object to be molded and bearing against said connecting members, said lateral insert elements being pivotally supported by pivots provided in said lower connecting members and means for adjustably supporting said lateral insert elements against said lateral connecting members.

7. A molding box for slabs, blocks and other objects having at least two plane, parallel faces, molded by tamping a mass of low plasticity, comprising in combination a pair of plane, parallel walls, lateral connecting members provided at the opposite sides of the parallel walls and lower connecting members provided adjustably beneath the parallel walls, the lateral connecting members being adapted to space apart said parallel walls at a distance corresponding to the width of the object to be molded, one lower and two lateral insert elements arranged between said parallel walls, adapted to determine with their inner faces the shape of the object to be molded and bearing against said connecting members, said lateral insert elements being pivotally supported by pivots provided in said lower connecting members, means for adjustably supporting said lateral insert elements against said lateral connecting members and means adapted to lift and turn the molding box.

8. A molding box for slabs, blocks and other objects having at least two plane, parallel faces, molded by tamping a mass of low plasticity, comprising in combination a pair of plane, parallel walls, lateral connecting members provided at the opposite sides of the parallel walls and lower connecting members provided adjustably beneath the parallel walls, the lateral connecting members being adapted to space apart said parallel walls at a distance corresponding to the width of the object to be molded, one lower and two lateral insert elements arranged between said parallel walls, adapted to determine with their inner faces the shape of the object to be molded and bearing against said connecting members, said lateral insert elements being pivotally supported by pivots provided in said lower connecting members and spindles pivotally connected at one end with the lateral insert elements and at the other end with the lateral connecting members and means for adjusting the length of said spindles.

9. A molding box for slabs, blocks and other objects having at least two plane, parallel faces, molded by tamping a mass of low plasticity, comprising in combination a pair of plane, parallel walls, lateral connecting members provided at the opposite sides of the parallel walls and lower connecting members provided adjustably beneath the parallel walls, the lateral connecting members being adapted to space apart said parallel walls at a distance corresponding to the width of the object to be molded, one lower and two lateral insert elements arranged between said parallel walls, adapted to determine with their inner faces the shape of the object to be molded and bearing against said connecting members, said lateral insert elements being pivotally supported by pivots provided in said lower connecting members, spindles pivotally connected at one end with the lateral insert elements and at the other end with the lateral connecting members, means for adjusting the length of said spindles and means adapted to lift and turn the molding box.

10. A molding box for slabs, blocks and other objects having at least two plane, parallel faces, molded by tamping a mass of low plasticity, comprising in combination a pair of plane, parallel walls, lateral connecting members provided at the opposite sides of the parallel walls and lower connecting members provided adjustably beneath the parallel walls, the lateral connecting members being adapted to space apart said parallel walls at a distance corresponding to the width of the object to be molded, one lower and two lateral insert elements arranged between said parallel walls, adapted to determine with their inner faces the shape of the object to be molded and bearing against said connecting members, said lateral insert elements being pivotally supported by pivots provided in said lower connecting members, spindles pivotally connected at one end with the lateral insert elements and at the other end mounted on crank-pins, the crank-shafts of which are mounted pivotally on the lateral connecting members and means for adjusting the length of said spindles.

11. A molding box for slabs, blocks and other objects having at least two plane, parallel faces, molded by tamping a mass of low plasticity, comprising in combination a pair of plane, parallel walls, lateral connecting members provided at the opposite sides of the parallel walls and lower connecting members provided adjustably beneath the parallel walls, the lateral connecting members being adapted to space apart said parallel walls at a distance corresponding to the width of the object to be molded, one lower and two lateral insert elements arranged between said parallel walls, adapted to determine with their inner faces the shape of the object to be molded and bearing against said connecting members, said lateral insert elements being pivotally supported by pivots provided in said lower connecting members, spindles pivotally connected at one end with the lateral insert elements and at the other end mounted on crank-pins, the crank-shafts of which are mounted pivotally on the lateral connecting members, means for adjusting the length of said spindles and means adapted to lift and turn the molding box.

In testimony whereof, I have signed my name to this specification at Cologne, Germany, this 22nd day of December, 1927.

HUGO ACKERMANN.